(12) United States Patent
Khan

(10) Patent No.: US 6,678,115 B2
(45) Date of Patent: Jan. 13, 2004

(54) HYDRODYNAMIC FLUID BEARING CONTAINING LUBRICANTS WITH REDUCED BUBBLE FORMING TENDENCY FOR DISK DRIVE APPLICATION

(75) Inventor: Raquib Uddin Khan, Pleasanton, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 132 days.

(21) Appl. No.: 10/095,352

(22) Filed: Mar. 13, 2002

(65) Prior Publication Data

US 2003/0086203 A1 May 8, 2003

Related U.S. Application Data

(60) Provisional application No. 60/338,216, filed on Nov. 8, 2001.

(51) Int. Cl.[7] .............................................. G11B 19/20
(52) U.S. Cl. ..................... 360/99.08; 384/107; 384/110
(58) Field of Search ........................... 360/98.07, 99.04, 360/99.08; 310/67 R, 90; 384/107, 110; 369/258

(56) References Cited

U.S. PATENT DOCUMENTS

| | | | |
|---|---|---|---|
| 5,516,212 A | | 5/1996 | Titcomb ..................... 384/107 |
| 5,766,513 A | | 6/1998 | Pillon et al. ................. 516/123 |
| 5,907,456 A | * | 5/1999 | Khan et al. ............... 360/99.08 |
| 5,930,075 A | | 7/1999 | Khan et al. ............... 360/99.08 |
| 5,940,246 A | | 8/1999 | Khan et al. ............... 360/99.08 |
| 5,993,066 A | | 11/1999 | Leuthold et al. ............ 384/113 |
| 6,090,758 A | | 7/2000 | Pillon et al. ................. 508/208 |
| 6,154,339 A | * | 11/2000 | Grantz et al. ............ 360/99.08 |
| 6,194,360 B1 | * | 2/2001 | Karis et al. .................. 508/438 |
| 6,364,532 B1 | * | 4/2002 | Yoshikawa et al. ......... 384/107 |
| 6,375,358 B1 | * | 4/2002 | Maekawa et al. ........... 384/107 |
| 6,483,215 B1 | * | 11/2002 | Bodmer et al. ............... 310/90 |
| 6,490,137 B1 | * | 12/2002 | Toyota et al. ............ 360/265.2 |
| 2003/0055179 A1 | * | 3/2003 | Ota et al. .................... 525/242 |

FOREIGN PATENT DOCUMENTS

WO      02/36079      11/2002

* cited by examiner

*Primary Examiner*—Jefferson Evans
(74) *Attorney, Agent, or Firm*—Moser, Patterson & Sheridan LLP

(57) ABSTRACT

A disc drive storage system includes a housing having a central axis, a stationary member that is fixed with respect to the housing and coaxial with the central axis, and a rotatable member that is rotatable about the central axis with respect to the stationary member. A hydro bearing interconnects the stationary member and the rotatable member and includes a lubricating fluid having a base fluid and an additive for reducing the tendency of bubble formation in the lubricating fluid.

20 Claims, 4 Drawing Sheets

HYDRODYNAMIC FLUID BEARING CONTAINING LUBRICANTS WITH REDUCED BUBBLE FORMING TENDENCY FOR DISK DRIVE APPLICATION

CROSS-REFERENCE TO RELATED APPLICATIONS

This application claims benefit of U.S. provisional patent application serial No. 60/338,216, filed Nov. 8, 2001, which is herein incorporated by reference.

BACKGROUND OF THE INVENTION

1. Field of the Invention

The present invention relates to the field of hydrodynamic bearing spindle motors for disc drive data storage devices and, more particularly, to a motor having a lubricant exhibiting reduced bubble forming tendency.

2. Description of the Related Art

Disc drive data storage devices, known as "Winchester" type disc drives, are well known in the industry. In a Winchester disc drive, digital data is written to and read from a thin layer of magnetizable material on the surface of rotating discs. Write and read operations are performed through a transducer that is carried in a slider body. The slider and transducer are sometimes collectively referred to as a head, and typically a single head is associated with each disc surface. The heads are selectively moved under the control of electronic circuitry to any one of a plurality of circular, concentric data tracks on the disc surface by an actuator device. Each slider body includes a self-acting air bearing surface. As the disc rotates, the disc drags air beneath the air bearing surface, which develops a lifting force that causes the slider to lift and fly several microinches above the disc surface.

In the current generation of disc drive products, the most commonly used type of actuator is a rotary moving coil actuator. The discs themselves are typically mounted in a "stack" on the hub structure of a brushless DC spindle motor. The rotational speed of the spindle motor is precisely controlled by motor drive circuitry, which controls both the timing and the power of commutation signals directed to the stator windings of the motor. Typical spindle motor speeds have been in the range of 3600 RPM. Current technology has increased spindle motor speeds to 7200 RPM, 10,000 RPM and above.

One of the principal sources of noise in disc drive data storage devices is the spindle motor. Disc drive manufacturers have recently begun looking at replacing conventional ball or roller bearings in spindle motors with "hydro" bearings, such as hydrodynamic or hydrostatic bearings. A hydro bearing relies on a fluid film which separates the bearing surfaces and is therefore much quieter and in general has lower vibrations than conventional ball bearings. A hydrodynamic bearing is a self-pumping bearing that generates a pressure internally to maintain the fluid film separation. A hydrostatic bearing requires an external pressurized fluid source to maintain the fluid separation. Relative motion between the bearing surfaces in a hydro bearing causes a shear element that occurs entirely within the fluid film such that no contact between the bearing surfaces occurs.

In a hydro bearing, a lubricant, such as a liquid or a gas, provides a bearing surface between a stationary member of the housing and a rotating member of the disc hub. Typical lubricants include oil or ferromagnetic fluids. Hydro bearings spread the bearing surface over a larger surface area in comparison with a ball bearing assembly, which comprises a series of point interfaces. This is desirable because the increased bearing surface decreases wobble or run-out between the rotating and fixed members.

In hydrodynamic fluid bearings, a principle design issue is preventing leakage of the lubricating fluid from the bearing during operation. Leakage can result from the continuous pressure cycling during start-stop processes of the spindle motor. At high pressures, air gets trapped in the lubricating fluid, and when the pressure is reduced, the trapped air forms bubbles and/or foam in the fluid. This bubble formation results in premature failure of the bearing and leakage of the lubricating fluid. In addition, foaming and/or bubble formation reduces the stiffness of the hydrodynamic bearing, increases the response time, reduces heat transfer, and results in a higher operating temperature—all of which are undesired in hydrodynamic bearing operation.

Therefore, there exits a need in the art for a hydrodynamic fluid bearing having lubricants exhibiting a reduced bubble-forming tendency.

SUMMARY OF THE INVENTION

The disc drive data storage system of the present invention includes a housing having a central axis, a stationary member that is fixed with respect to the housing and coaxial with the central axis, and a rotatable member that is rotatable about the central axis with respect to the stationary member. A stator is fixed with respect to the housing. A rotor is supported by the rotatable member and is magnetically coupled to the stator. At least one data storage disc is attached to and is coaxial with the rotatable member. A hydro bearing interconnects the stationary member and the rotatable member and includes a lubricating fluid comprising a base fluid and an additive for reducing the tendency of bubble formation in the lubricating fluid due to sudden pressure fluctuations.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
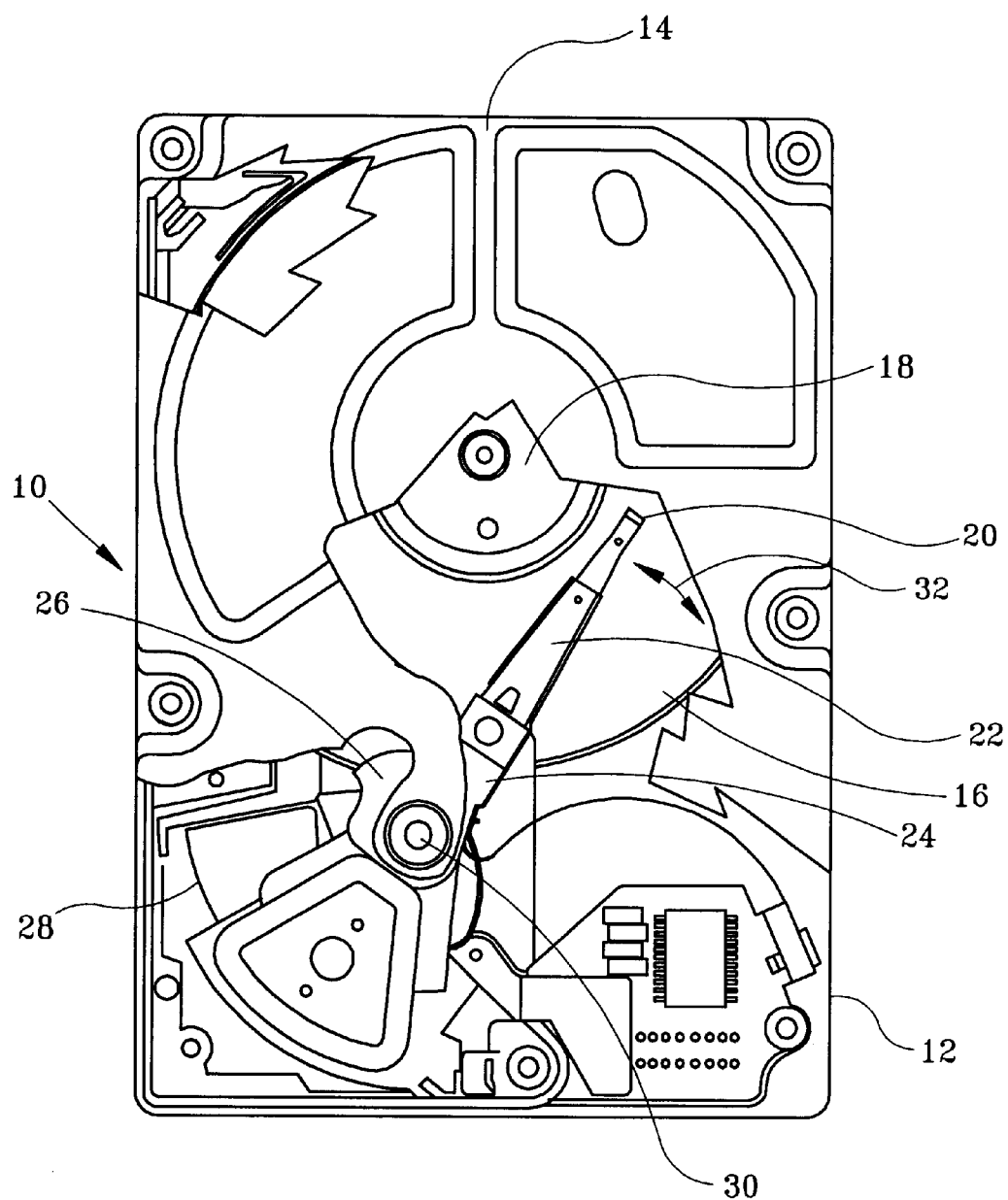
FIG. 1 is a top plan view of a disc drive data storage device in accordance with the present invention.

The present invention is a disc drive data storage device having a hydrodynamic or hydrostatic bearing spindle motor with a lubricating fluid composition that exhibits a reduced bubble-forming tendency for the unique requirements of a disc drive. FIG. 1 is a top plan view of a typical disc drive 10 in which the present invention is useful. Disc drive 10 includes a housing base 12 that is combined with top cover 14 to form a sealed environment to protect the internal components from contamination by elements from outside the sealed environment.

Disc drive 10 further includes a disc pack 16, which is mounted for rotation on a spindle motor (not shown) by a disc clamp 18. Disc pack 16 includes a plurality of individual discs, which are mounted for co-rotation about a central axis. Each disc surface has an associated head 20, which is mounted to disc drive 10 for communicating with the disc surface. In the example shown in FIG. 1, heads 20 are supported by flexures 22, which are in turn attached to head mounting arms 24 of an actuator body 26. The actuator shown in FIG. 1 is of the type known as a rotary moving coil actuator and includes a voice coil motor (VCM), shown generally at 28. Voice coil motor 28 rotates actuator body 26 with its attached heads 20 about a pivot shaft 30 to position heads 20 over a desired data track along an arcuate path 31. While a rotary actuator is shown in FIG. 1, the present invention is also useful in disc drives having other types of actuators, such as linear actuators.

Figure 2:
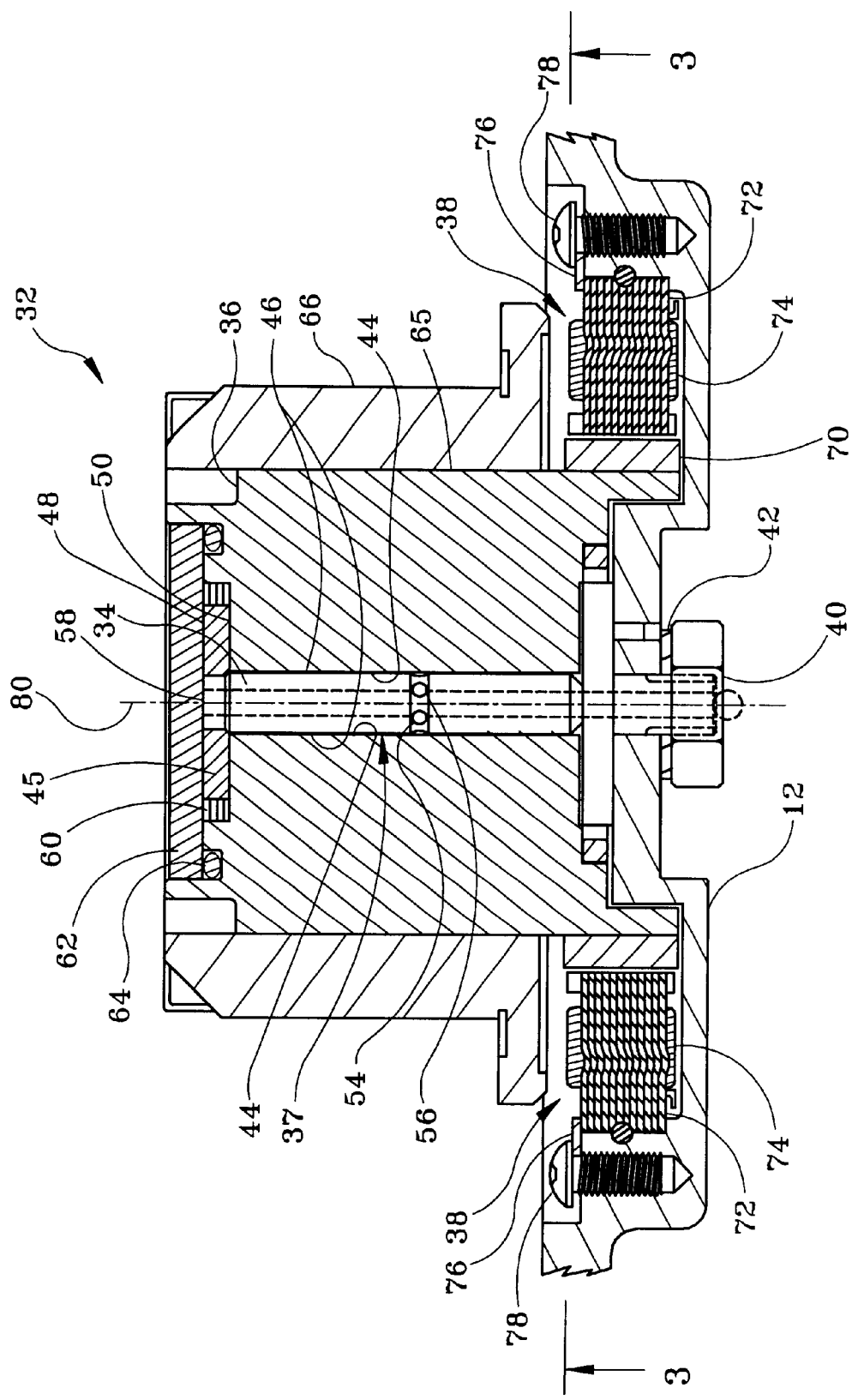
FIG. 2 is a sectional view of a hydrodynamic bearing spindle motor in accordance with the present invention.

FIG. 2 is a sectional view of a hydrodynamic bearing spindle motor 32 in accordance with the present invention. Spindle motor 32 includes a stationary member 34, a hub 36 and a stator 38. In the embodiment shown in FIG. 2, the stationary member is a shaft that is fixed and attached to base 12 through a nut 40 and a washer 42. Hub 36 is interconnected with shaft 34 through a hydrodynamic bearing 37 for rotation about shaft 34. Bearing 37 includes radial working surfaces 44 and 46 and axial working surfaces 48 and 50. Shaft 34 includes fluid ports 54, 56 and 58 that supply lubricating fluid 60 and assist in circulating the fluid along the working surfaces of the bearing. Lubricating fluid 60 is supplied to shaft 34 by a fluid source (not shown) that is coupled to the interior of shaft 34 in a known manner.

Spindle motor 32 further includes a thrust bearing 45, which forms the axial working surfaces 48 and 50 of hydrodynamic bearing 37. A counterplate 62 bears against working surface 48 to provide axial stability for the hydrodynamic bearing and to position hub 36 within spindle motor 32. An O-ring 64 is provided between counterplate 62 and hub 36 to seal the hydrodynamic bearing. The seal prevents hydrodynamic fluid 60 from escaping between counterplate 62 and hub 36.

Hub 36 includes a central core 65 and a disc carrier member 66, which supports disc pack 16 (shown in FIG. 1) for rotation about shaft 34. Disc pack 16 is held on disc carrier member 66 by disc clamp 18 (also shown in FIG. 1). A permanent magnet 70 is attached to the outer diameter of hub 36, which acts as a rotor for spindle motor 32. Core 65 is formed of a magnetic material and acts as a back-iron for magnet 70. Rotor magnet 70 can be formed as a unitary, annular ring or can be formed of a plurality of individual magnets that are spaced about the periphery of hub 36. Rotor magnet 70 is magnetized to form one or more magnetic poles.

Stator 38 is attached to base 12 and includes stator laminations 72 and stator windings 74. Stator windings 74 are attached to laminations 72. Stator windings 74 are spaced radially from rotor magnet 70 to allow rotor magnet 70 and hub 36 to rotate about a central axis 80. Stator 38 is attached to base 12 through a known method such as one or more C-clamps 76 which are secured to the base through bolts 78.

Commutation pulses applied to stator windings 74 generate a rotating magnetic field that communicates with rotor magnet 70 and causes hub 36 to rotate about central axis 80 on bearing 37. The commutation pulses are timed, polarization-selected DC current pulses that are directed to sequentially selected stator windings to drive the rotor magnet and control its speed.

In the embodiment shown in FIG. 2, spindle motor 32 is a "below-hub" type motor in which stator 38 has an axial position that is below hub 36. Stator 38 also has a radial position that is external to hub 36, such that stator windings 74 are secured to an inner diameter surface 82 (FIG. 3) of laminations 72. In an alternative embodiment, the stator is positioned within the hub, as opposed to below the hub. The stator can have a radial position that is either internal to the hub or external to the hub. In addition, the spindle motor of can have a fixed shaft, as shown in FIG. 2, or a rotating shaft. In a rotating shaft spindle motor, the bearing is located between the rotating shaft and an outer stationary sleeve that is coaxial with the rotating shaft.

Figure 3:
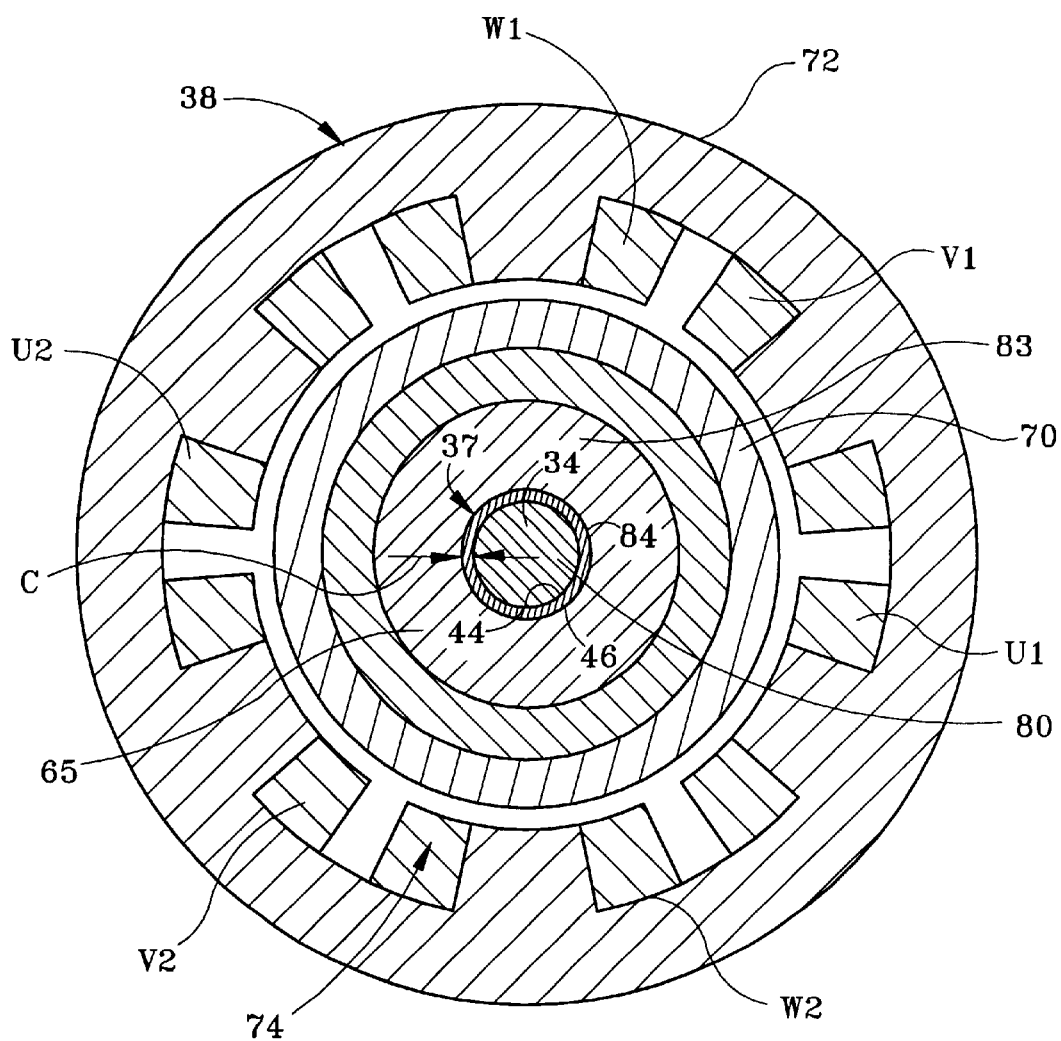
FIG. 3 is a diagrammatic sectional view of the hydrodynamic spindle motor taken along the line 3—3 of FIG. 2, with portions removed for clarity.

FIG. 3 is a diagrammatic sectional view of hydrodynamic spindle motor 32 taken along line 3—3 of FIG. 2, with portions removed for clarity. Stator 38 includes laminations 72 and stator windings 74, which are coaxial with rotor magnet 70 and central core 65. Stator windings 74 include phase windings W1, V1, U1, W2, V2 and U2 that are wound around teeth in laminations 72. The phase windings are formed of coils that have a coil axis that is normal to and intersects central axis 80. For example, phase winding W1 has a coil axis 83 that is normal to central axis 80. Radial working surfaces 44 and 46 of hydrodynamic bearing 37 are formed by the outer diameter surface of shaft 34 and the inner diameter surface of central core 65. Radial working surfaces 44 and 46 are separated by a lubrication fluid 60, which maintains a clearance c during normal operation.

As described above, when the pressure inside the hydrodynamic bearing 37 continuously increases and then decreases, dissolved gas separates out and foam and/or bubbles form in the lubrication fluid 60 because of the sudden pressure fluctuations. In accordance with the present invention, the lubrication fluid 60 comprises a base fluid and at least one additive for reducing the tendency of the fluid 60 to form bubbles and/or foam. Preferred base fluids include perfluoropolyethers (PFPEs), esters, synthetic hydrocarbons, and highly refined mineral hydrocarbons. Most preferred base fluids include diesters, short chain alcohol esters, polyol esters, and polyalphaolefins (PAO's). These base fluids can also be blended in a variety of combinations.

The additive is selected so as to change the surface tension value at the gas-lubricant interface of the lubrication fluid 60. The additive is at least partially soluble in the base fluid and has a low surface tension value compared to the base fluid. The additive causes the surface tension of the lubrication fluid 60 to reach a point where any bubbles that form therein will either collapse or open up to allow the gas to escape. Thus, the present invention advantageously reduces the tendency of bubble formation in the lubrication fluid 60 thereby maintaining adequate stiffness, response time, heat transfer, and operating temperature of the hydrodynamic bearing 37.

Additives that can be used with the present invention include polysiloxanes (silicones), polyacrelates, organic copolymars, and fluorocarbon compounds, such as PFPEs. Specific PFPEs that can be used with the present invention include FOMBLIN Z-DOL and FOMBLIN AM-2000, both commercially available from Ausimont, located in Morristown N.J. Z-DOL is a random copolymer of perfluorinated ethylene oxide and perfluorinated methylene oxide. AM-2000 is a difunctional aromatic terminated perfluoropolyether. Another additive that can be used with the present invention is VANLUBE DF 283, commercially available from RT Vanderbilt, located in Norwalk, Conn.

In one embodiment of the invention, the desired surface tension of the lubrication fluid 60 is less than 35 dynes/cm, preferably in the range between 12 and 35 dynes/cm. The additive causes the lubrication fluid 60 to preferably have as surface tension lower than that of the base fluid alone. For example, the surface tension of a typical base fluid (e.g., ester oil) is between 28 and 35 dynes/cm. The additive comprises between 0.02% and 0.5% by volume of the lubrication fluid 60. Such a ratio of the additive to the base fluid reduces the surface tension of the lubrication fluid 60 to the desired range. In addition, the ratio of additive to base fluid is selected such that it does not sacrifice desirable lubricating properties, such as anti-oxidation, anti-corrosion, and anti-wear performance, or it does not behave antagonistically with other helpful additives present in the lubrication fluid 60.

In one example, the base fluid comprises TMP ester or di-2-ethylhexl sebacic acid ester having a surface tension between 27 and 33 dynes/cm, and the additive comprises silicone fluid having a surface tension between 20 and 22 dynes/cm. In another example, the base fluid comprises TMP ester or di-2-ethylhexl sebacic acid ester having a surface tension between 27 and 33 dynes/cm, and the additive comprises PFPE having a surface tension between 15 and 20 dynes/cm. In both of the above examples, the present invention reduces the tendency of the lubrication fluid 60 to form bubbles under sudden pressure fluctuations.

In another embodiment of the invention, the lubrication fluid 60, comprising the base fluid and additive as described above, is stored in a low-pressure environment. Storing the lubrication fluid 60 in a low-pressure environment will reduce the tendency of the lubrication fluid 60 to form bubbles and/or foam when used in the hydrodynamic bearing 37. The lubrication fluid 60 can be stored in an environment having a pressure that is less than atmospheric pressure, for example, an environment having a pressure between 1 and 750 Torr.

Figure 4:
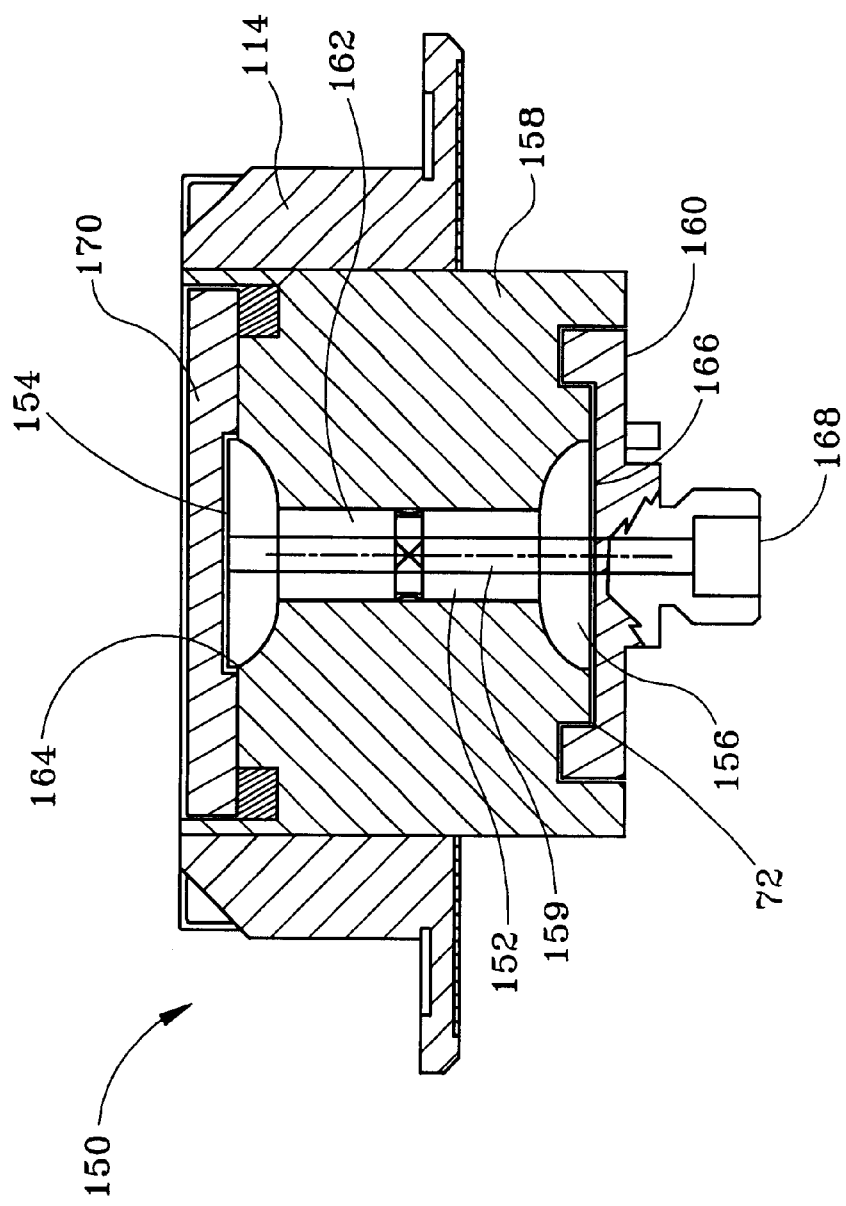
FIG. 4 is a sectional view of a hydrodynamic bearing with conical bearing surfaces.

Referring to FIG. 4, a hydrodynamic bearing is shown with hemispherical bearing surfaces, which is usable to drive the discs in the disc drive 10 of FIG. 1. The hydrodynamic bearing is shown incorporated in a spindle motor 150. The design includes a drive rotor or hub 114 rotatably coupled to a shaft 152. The shaft 152 includes an upper hemisphere or convex portion 154 and a lower hemisphere or convex portion 156 received in a sleeve 158, which rotates relative to the shaft. The shaft is fixedly attached to a base 160, which may be incorporated in or supported from the housing base 12 described with respect to FIG. 1. The sleeve 158 receives the journal 162 of shaft 152 and has upper hemisphere shaped, concave receptacle 164 and lower hemisphere shaped concave receptacle 166. A fill hole 168 is also provided to a reservoir 159 in (as drawn, the upper end) fixed member 152, to provide bearing fluid to the hydrodynamic bearing. The rotor 114 includes a counterplate 170, which is used to close off one end of the hydrodynamic bearing to the atmosphere. In operation, the bearings shown in this figure comprise hydrodynamic bearings in which fluid, such as oil, circulates through gaps between the fixed member, which is the shaft and the rotating member, which in this case is the sleeve. In accordance with the present invention, at least one additive can be added to the fluid, as described above, to reduce foaming and/or bubble formation therein.

While foregoing is directed to the preferred embodiment of the present invention, other and further embodiments of the invention may be devised without departing from the basic scope thereof, and the scope thereof is determined by the claims that follow.

What is claimed is:

1. A disc drive storage system comprising:
   a housing having a central axis;
   a stationary member that is fixed with respect to the housing and coaxial with the central axis;
   a stator fixed with respect to the housing;
   a rotatable member that is rotatable about the central axis with respect to the stationary member;
   a rotor supported by the rotatable member and magnetically coupled to the stator;
   at least one data storage disc attached to and coaxial with the rotatable member;
   an actuator supporting a head proximate to the data storage disc for communicating with the disc; and
   a hydro bearing interconnecting the stationary member and the rotatable member and having working surfaces separated by a lubricating fluid comprising a base fluid and an additive for reducing the tendency of bubble formation in the lubricating fluid.

2. The disc drive storage system of claim 1 wherein the additive decreases the surface tension of the base fluid.

3. The disc drive storage system of claim 2 wherein the surface tension of the lubricating fluid is between 12 and 35 dynes/cm at room temperature.

4. The disc drive storage system of claim 3 wherein the additive is selected from the group consisting of polysiloxanes, polyacrelates, organic copolymars, and perfluoropolyethers.

5. The disc drive storage system of claim 4 wherein the additive is selected from the group of FOMBLIN Z-DOL, FOMBLIN AM-2000, and VANLUBE DF-283.

6. The disc drive storage system of claim 2 wherein the additive comprises between 0.02% and 0.5% by volume of the lubricating fluid.

7. The disc drive storage system of claim 1 wherein the lubricating fluid is stored in an environment having a pressure that is less than atmospheric pressure.

8. The disc drive storage system of claim 7 wherein the pressure is between 1 and 750 Torr.

9. A motor comprising:
   a housing having a central axis;
   a stationary member that is fixed with respect to the housing and coaxial with the central axis;
   a stator fixed with respect to the housing;
   a rotatable member that is rotatable about the central axis with respect to the stationary member;
   a rotor supported by the rotatable member and magnetically coupled to the stator; and
   a hydro bearing interconnecting the stationary member and the rotatable member and having working surfaces separated a lubricating fluid comprising a base fluid and an additive for reducing the tendency of bubble formation in the lubricating fluid.

10. The motor of claim 9 wherein the additive decreases the surface tension of the base fluid.

11. The motor of claim 10 wherein the surface tension of the lubricating fluid is between 12 and 35 dynes/cm at room temperature.

12. The motor of claim 11 wherein the additive is selected from the group consisting of polysiloxanes, polyacrelates, organic copolymars, and perfluoropolyethers.

13. The motor of claim 12 wherein the additive is selected from the group of FOMBLIN Z-DOL, FOMBLIN AM-2000, and VANLUBE DF-283.

14. The motor of claim 10 wherein the additive comprises between 0.02% and 0.5% by volume of the lubricating fluid.

15. The motor of claim 9 wherein the lubricating fluid is stored in an environment having a pressure that is less than atmospheric pressure.

16. The motor of claim 15 wherein the pressure is between 1 and 750 Torr.

17. A motor comprising:

a housing having a central axis;

a stationary member that is fixed with respect to the housing and coaxial with the central axis;

a stator fixed with respect to the housing;

a rotatable member that is rotatable about the central axis with respect to the stationary member;

a rotor supported by the rotatable member and magnetically coupled to the stator;

a hydro bearing interconnecting the stationary member and the rotatable member and having working surfaces separated by a lubricating fluid; and means for reducing the tendency of bubble formation in the lubricating fluid.

18. The motor of claim 7 wherein the means for reducing the tendency of bubble formation is an additive to a base fluid of the lubricating fluid that decreases the surface tension of the base fluid.

19. The motor of claim 18 wherein the surface tension of the lubricating fluid is between 12 and 35 dynes/cm at room temperature.

20. The motor of claim 18 wherein the additive comprises between 0.02% and 0.5% by volume of the lubricating fluid.

* * * * *